3,138,632
2-CYANO-1,1-ETHANEDISULFONIC ACID DISALTS AND PROCESS FOR PREPARING THE SAME

Frank Scotti, Westport, Conn., and Everett Joseph Frazza, Yorktown Heights, N.Y., assignors to American Cyanamid Company, Stamford, Conn., a corporation of Maine
No Drawing. Filed Jan. 17, 1963, Ser. No. 252,019
6 Claims. (Cl. 260—465.1)

This invention relates to salts of 2-cyano-1,1-ethanedisulfonic acid disalts and to a process for preparing the same. More particularly, it relates to alkali metal and ammonium salts of 2-cyano-1,1-ethanedisulfonic acid and to a process for preparing the same in good yield from readily available starting materials.

It has now been discovered that alkali metal salts and ammonium salts of 2-cyano-1,1-ethanedisulfonic acid may be simply and conveniently prepared by reacting β-chloroacrylonitrile with an alkali metal or ammonium sulfite or bisulfite in an aqueous medium at an elevated temperature. Illustratively, the reaction of sodium bisulfite with β-chloroacrylonitrile is believed to proceed as follows:

(I)
$3NaHSO_3 + ClCH=CHCN \longrightarrow$

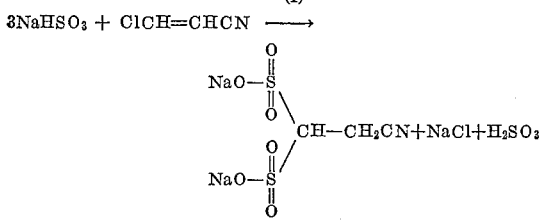

In carrying out the process of the present invention, as will be noted from the reaction scheme of I, an amount of alkali metal or ammonium bisulfite approximately equivalent to three moles for each mole of β-chloroacrylonitrile is employed.

However, when an alkali metal or ammonium sulfite is employed in the process the reaction is assumed to follow the following course:

(II)
$2Na_2SO_3 + 2ClCH=CHCN \longrightarrow$

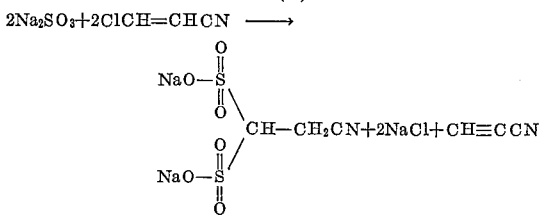

Observation of the reaction of II, in which sodium sulfite is illustratively used, indicates that an amount of alkali metal or ammonium sulfite approximately equivalent to two moles is employed for each two moles of β-chloroacrylonitrile.

While the theory of the reaction is not completely understood, nevertheless, it is believed that the first mole of alkali metal or ammonium sulfite or bisulfite attacks the chlorine atom of β-chloroacrylonitrile so as to form a 2-cyano-1-ethanemonosulfonic acid salt. Subsequently, the second mole of alkali metal or ammonium sulfite or bisulfite adds to the 2-cyano-1-ethanemonosulfonic acid salt whereby the final product, a 2-cyano-1,1-ethanedisulfonic acid disalt, is obtained.

It is essential that the process be carried out in an aqueous medium or at least in a medium in which water is present to some extent, e.g., 10% to 20% of a water-alcohol mixture or of a water-dimethyl formamide mixture. While an alkali metal or ammonium sulfite or bisulfite may be employed in the process, it is generally preferable to employ a bisulfite salt inasmuch as the bisulfite salt is less basic than the corresponding sulfite salt and less desirable side reactions, e.g., dehydrohalogenation, are observed to take place. Suitable alkali metal sulfites which may be employed are sodium sulfite, potassium sulfite, lithium sulfite and the like. Typical alkali metal bisulfites which may be used are sodium bisulfite, potassium bisulfite and the like.

While order of the addition of the reactants is not critical, it is generally preferable to add β-chloroacrylonitrile to a reaction vessel containing the sulfite or bisulfite salt in an aqueous medium.

Temperatures ranging from about 40° to about 100° C. have been employed with good success. Generally, however, temperatures between about 50° and about 90° C. are preferred.

As was stated hereinabove, it is necessary that water be present in the reaction medium. While an all-water system is generally preferable, it is also contemplated that a portion of the reaction medium may comprise a water miscible aliphatic alcohol such as methyl alcohol, ethyl alcohol, propyl alcohol, butyl alcohol and the like and mixtures of such aliphatic alcohols as well as dimethyl formamide.

After completion of the reaction which is of a duration of from about several hours to about twenty-four hours, the 2-cyano-1,1-ethanedisulfonic acid disalt product is precipitated from the reaction medium, e.g., by the addition of an aliphatic alcohol such as methyl alcohol, ethyl alcohol, propyl alcohol, butyl alcohol and the like. Isolation of the product is then accomplished by filtration, centrifugation or other conventional methods of separation.

The products of this invention are valuable intermediates for the preparation of other compounds which find use as surface active agents, detergents and emulsifying agents. Thus such products are readily obtained by hydrolysis of the nitrile grouping to an amide in a conventional manner.

In order to illustrate the present invention, the following examples, in which all parts are by weight unless otherwise specified, are given.

EXAMPLE 1

*Preparation of 2-Cyano-1,1-Ethanedisulfonic Acid, Disodium Salt*

SODIUM BISULFITE METHOD

A solution of 20.8 parts of sodium bisulfite in 100 parts of water is added to a reaction vessel equipped with a reflux condenser and a stirring device. To this solution, 8.75 parts of β-chloroacrylonitrile is added and then the reaction mixture is heated to 80° C. and kept at this temperature for 24 hours. (During the course of the reaction the mixture becomes homogeneous and the odor of sulfur dioxide is apparent.) The solution is allowed to cool and the disodium salt is precipitated upon the addition of methanol. On filtration the product is obtained in 92.5% yield.

Analysis for $C_3H_3Na_2S_2O_6N$.—Theory: C, 13.90; H, 1.17; N, 5.40. Found: C, 13.44; H, 1.47; N, 5.17.

The infrared spectrum is consistent with the proposed structure.

EXAMPLE 2

*Preparation of 2-Cyano-1,1-Ethanedisulfonic Acid, Disodium Salt*

SODIUM SULFITE METHOD

A solution of 12.6 parts of sodium sulfite in 50 parts of water is added to a suitable reaction flask and to this 8.75 parts of β-chloroacrylonitrile is added. After the entire amount of β-chloroacrylonitrile is added, the solution is heated to about 50° C. and the stirring continued for 24 hours. The product is isolated as in Example 1. Elemental and infrared analysis confirms that a product identical to that obtained in Example 1 is obtained.

This application is a continuation-in-part of our application Serial No. 72,295, filed November 29, 1960, now abandoned.

While the foregoing invention has been described in conjunction with various preferred embodiments, it is to be understood that the invention is not to be solely limited thereto but is to be construed broadly and restricted only by the following appended claims.

We claim:

1. A process for the preparation of a compound selected from the group consisting of alkali metal salts and ammonium salts of 2-cyano-1,1-ethanedisulfonic acid which comprises reacting β-chloroacrylonitrile with

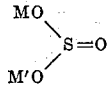

in which M is selected from the group consisting of alkali metals and ammonium and M' is selected from the group consisting of alkali metals, ammonium and hydrogen in an aqueous medium at a temperature between about 40° C. and 100° C. and recovering the resultant salt.

2. A process as in claim 1 in which the reaction is conducted at a temperature between about 50° C. and 90° C.

3. A process as in claim 1 in which M' of

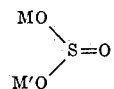

is hydrogen.

4. A compound of the formula:

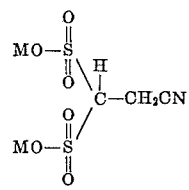

in which M is selected from the group consisting of alkali metals and ammonium.

5. A compound as in claim 4 in which M is sodium.

6. A compound as in claim 4 in which M is potassium.

No references cited.